(12) United States Patent
Hirata et al.

(10) Patent No.: US 10,131,722 B2
(45) Date of Patent: Nov. 20, 2018

(54) METHOD FOR PREPARING TERMINAL-MODIFIED CONJUGATED DIENE POLYMER, TERMINAL-MODIFIED CONJUGATED DIENE POLYMER, RUBBER COMPOSITION AND TIRE

(71) Applicant: BRIDGESTONE CORPORATION, Tokyo (JP)

(72) Inventors: Narukuni Hirata, Tokyo (JP); Yusuke Yamagata, Tokyo (JP); Tomoe Tanabe, Tokyo (JP); Shojiro Kaita, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/503,884

(22) PCT Filed: Jul. 2, 2015

(86) PCT No.: PCT/JP2015/003347
§ 371 (c)(1),
(2) Date: Feb. 14, 2017

(87) PCT Pub. No.: WO2016/027401
PCT Pub. Date: Feb. 25, 2016

(65) Prior Publication Data
US 2017/0275400 A1    Sep. 28, 2017

(30) Foreign Application Priority Data

Aug. 20, 2014    (JP) .................. 2014-167707

(51) Int. Cl.
| | |
|---|---|
| C08F 36/02 | (2006.01) |
| C08F 4/12 | (2006.01) |
| C08F 8/18 | (2006.01) |
| C08F 8/34 | (2006.01) |
| C08F 8/40 | (2006.01) |
| B60C 1/00 | (2006.01) |

(52) U.S. Cl.
CPC ............... *C08F 36/02* (2013.01); *C08F 4/12* (2013.01); *C08F 8/18* (2013.01); *C08F 8/34* (2013.01); *C08F 8/40* (2013.01); *B60C 1/00* (2013.01); *C08J 2353/02* (2013.01)

(58) Field of Classification Search
CPC ...... C08F 4/12; C08F 8/18; C08F 8/34; C08F 8/40; C08F 36/02
USPC .................... 526/164, 903; 525/333.1, 333.2
See application file for complete search history.

(56) References Cited

U.S. PATENT DOCUMENTS

| | | | | |
|---|---|---|---|---|
| 4,906,706 | A | * | 3/1990 | Hattori .................... C08C 19/00 525/343 |
| 2004/0152882 | A1 | | 8/2004 | Ekhom et al. |
| 2009/0253869 | A1 | | 10/2009 | Smale et al. |
| 2009/0292043 | A1 | | 11/2009 | Kurazumi et al. |
| 2010/0317794 | A1 | | 12/2010 | Tanaka et al. |
| 2011/0112212 | A1 | | 5/2011 | Kimura et al. |
| 2014/0011963 | A1 | * | 1/2014 | McCauley ................ C08F 4/12 525/382 |

FOREIGN PATENT DOCUMENTS

| | | |
|---|---|---|
| CN | 101160328 A | 4/2008 |
| CN | 101889050 A | 11/2010 |
| CN | 102015871 A | 4/2011 |
| EP | 0 664 304 A2 | 7/1995 |
| EP | 1401880 A1 | 3/2004 |
| EP | 1 449 857 A1 | 8/2004 |
| EP | 1 647 571 A1 | 4/2006 |
| EP | 1 873 168 A1 | 1/2008 |
| EP | 2 223 959 A1 | 9/2010 |
| EP | 2 253 664 A1 | 11/2010 |
| EP | 2 810 960 A1 | 12/2014 |
| JP | 2004-532346 A | 10/2004 |
| JP | 2005-082735 A | 3/2005 |
| JP | 2005-530872 A | 10/2005 |

(Continued)

OTHER PUBLICATIONS

International Search Report of PCT/JP2015/003347 dated Oct. 6, 2015.
Communication dated Nov. 23, 2017 issued by the State Intellectual Property Office of People's Republic of China in counterpart application No. 2015800447770.
Communication dated Apr. 27, 2018 issued by the Intellectual Property Office of Russian Federation in counterpart application No. 2017108844/05.

(Continued)

*Primary Examiner* — Fred M Teskin
(74) *Attorney, Agent, or Firm* — Sughrue Mion, PLLC

(57) ABSTRACT

This disclosure is to provide a method for preparing a terminal-modified conjugated diene polymer which achieves an extremely high compounding amount of cis-1,4 without complicated preparing conditions, a terminal-modified conjugated diene polymer obtained via the method, a rubber composition containing the terminal-modified conjugated diene polymer, and a tire using the rubber composition. This disclosure is A method for preparing a terminal-modified conjugated diene polymer comprising: polymerizing a conjugated diene compound by using a polymerization catalyst composition and modifying a polymer obtained via the polymerization by using a modifier, wherein the polymerization catalyst composition contains a rare earth element compound, and a coordination compound having a cyclopentadiene skeleton selected from substituted or unsubstituted cyclopentadienes, substituted or unsubstituted indenes, and substituted or unsubstituted fluorenes, and wherein the polymerization and modification is performed in a one-pot way.

7 Claims, No Drawings

(56) References Cited

FOREIGN PATENT DOCUMENTS

| JP | 4117250 B2 | 7/2008 |
|---|---|---|
| JP | 2010-163542 A | 7/2010 |
| JP | 2011-111497 A | 6/2011 |
| JP | 2013-53213 A | 3/2013 |
| JP | 2013-194100 A | 9/2013 |
| RU | 2425845 C2 | 8/2011 |
| RU | 2464280 C2 | 10/2012 |
| WO | 2006/112450 A1 | 10/2006 |
| WO | 2013/101861 A1 | 7/2013 |
| WO | 2013/115242 A1 | 8/2013 |

* cited by examiner

METHOD FOR PREPARING TERMINAL-MODIFIED CONJUGATED DIENE POLYMER, TERMINAL-MODIFIED CONJUGATED DIENE POLYMER, RUBBER COMPOSITION AND TIRE

CROSS REFERENCE TO RELATED APPLICATIONS

This application is a National Stage of International Application No. PCT/JP2015/003347 filed Jul. 2, 2015, claiming priority based on Japanese Patent Application No. 2014-167707 filed Aug. 20, 2014, the contents of all of which are incorporated herein by reference in their entirety.

TECHNICAL FIELD

This disclosure relates to a method for preparing a terminal-modified conjugated diene polymer, in particular, a method for preparing a terminal-modified conjugated diene polymer which achieves an extremely high compounding amount of cis-1,4 without complicated preparing conditions, and also relates to a terminal-modified conjugated diene polymer, a rubber composition, and a tire.

BACKGROUND

Recently, on the basis of the societal demand of resource-saving and energy-saving, a request for a lower fuel consumption of automobiles is growing gradually, and a tire which is excellent in wear resistance, crack growth resistance, etc. is in demand. It is known as a technique for improving the durability of the tire to stereoregularly control the micro structure of rubber components compounded to the tire.

On the other hand, it is known that natural rubber has a micro structure where the cis-1,4 bonding amount is 99.7%, and it is recognized that the strain-induced crystallizability is improved due to the high stereoregularity. Regarding the rubber composition using the natural rubber, it is capable of exhibiting high durability when used for a tire. Moreover, it is known that it is also possible to improve the durability by stereoregularly controlling the micro structure of polybutadiene.

It is disclosed in PTL1 that it is possible to synthesize a polybutadiene with a high cis-1,4 bonding amount by using a catalyst system obtained by adding conjugated diene monomer to neodymium compounds.

Moreover, disclosed in PTL2 is a technique for preparing a modified conjugated diene polymer having a modification efficiency of a specific value or more and a high cis-1,4 content in the conjugated diene moiety, by modification of a polymer with a specific modifier, the polymer being prepared by polymerization of a conjugated diene compound using a catalyst containing a lanthanoid rare earth metal compound in an organic solvent and having an active organic metal site, the modified conjugated diene polymer.

CITATION LIST

Patent Literature

PTL1: JP2005-530872A
PTL2: WO2006/112450A1

SUMMARY

Technical Problem

However, according to the technique of PTL1 and PTL2, in order to obtain a high cis-1,4 bounding amount, it is necessary to perform strict condition management such as polymerizing at a low temperature (room temperature or lower). Therefore, development of a technique, which is capable of efficiently obtaining a terminal-modified conjugated diene polymer having an extremely high cis-1,4 bonding amount without complicated conditions, has been desired.

An object of this disclosure is to provide a method for preparing a terminal-modified conjugated diene polymer which achieves an extremely high compounding amount of cis-1,4 without complicated preparing conditions, and to provide a rubber composition and a tire excellent in durability (fracture resistance, wear resistance and crack growth resistance), and in addition, to provide a rubber composition and a tire using the rubber composition excellent in durability (fracture resistance, wear resistance and crack growth resistance).

Solution to Problem

After intensive study on the aforementioned purpose, we conceived this disclosure by discovering that: by using a rare earth element compound containing at least one nitrogen atom and a coordination compound having a specific cyclopentadiene skeleton as a polymerization catalyst composition, such coordination compound is capable of improving the catalytic activity instead of conventionally used co-catalysts as the anionic ligand, and thus is capable of achieving extremely high cis-1,4 bonding amount and terminal modification efficiency even at a high polymerization temperature, and is capable of preparing a terminal-modified conjugated diene polymer without complicated process due to one-pot polymerization and modification.

This disclosure is based on such knowledge, and its subject is as follows.

The method for preparing a terminal-modified conjugated diene polymer of this disclosure is a method for preparing a terminal-modified conjugated diene polymer comprising: polymerizing a conjugated diene compound by using a polymerization catalyst composition and modifying a polymer obtained via the polymerization by using a modifier, wherein the polymerization catalyst composition contains a rare earth element compound, and a coordination compound having a cyclopentadiene skeleton selected from substituted or unsubstituted cyclopentadienes, substituted or unsubstituted indenes, and substituted or unsubstituted fluorenes, and wherein the polymerization and modification is performed in a one-pot way.

Here, the rare-earth element compound is preferably represented by general formula (a-1):

$$M\text{-}(AQ^1)(AQ^2)(AQ^3) \qquad (a\text{-}1)$$

(in the formula, M is scandium, yttrium or lanthanides: $(AQ)^1$, $(AQ)^2$ and $(AQ)^3$ are the same or different functional groups having at least one M-A bonds, where A is nitrogen, oxygen or sulfur). Such compound is capable of further improving the catalyst activity.

The catalyst composition preferable further contains a compound represented by general formula (X). Such compound is capable of further improving the catalyst activity.

$$YR^{31}_a R^{32}_b R^{33}_c \qquad (X)$$

(in the formula, Y is a metallic element selected from Group 1, Group 2, Group 12 and Group 13 of the Periodic Table. $R^{31}$ and $R^{32}$ are C1 to C10 hydrocarbon groups or hydrogen atom, $R^{33}$ is a C1 to C10 hydrocarbon group, where $R^{31}$, $R^{32}$ and $R^{33}$ may be the same or different from each other; in addition, in the case that Y is a metallic element selected from Group 1 of the Periodic Table, a=1 and b, c=0; in the case that Y is a metallic element selected from Group 2 and Group 12 of the Periodic Table, a, b=1 and c=0; and in the case that Y is a metallic element selected from Group 13 of the Periodic Table, a, b, c=1)

Here, the coordination compound having a cyclopentadiene skeleton preferably has an indenyl group. Such compound is capable of further improving the catalyst activity.

Moreover, the polymerization catalyst composition preferably further contains an aluminoxane composition, and/or contains a halogen compound. Such compound is capable of further improving the catalyst activity.

Furthermore, the modifier is preferably at least one selected from specific compounds (a) to (j). Such compound is capable of improving the terminal modification effect of the polymer.

(a) is a compound represented by general formula (V):

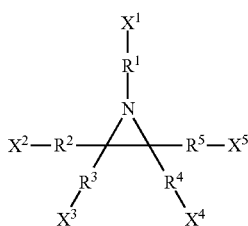

(where $X^1$ to $X^5$ each represent a monovalent functional group containing at least one selected from the group consisting of a hydrogen atom, a halogen atom, carbonyl groups, thiocarbonyl groups, isocyanate groups, thioisocyanate groups, epoxy groups, thioepoxy groups, halogenated silyl groups, hydrocarbyloxysilyl groups, and sulfonyloxy groups, and containing no active proton nor onium salt; $X^1$ to $X^5$ may be the same or different with provizo that at least one of $X^1$ to $X^5$ is not a hydrogen atom; $R^1$ to $R^5$ independently represent a single bond or a divalent C1 to C18 hydrocarbon group; and a plurality of aziridine rings may be bonded via any of $X^1$ to $X^5$ and $R^1$ to $R^5$).

(b) is a halogenated organic metal compound, halogenated metal compound, or organic metal compound represented by $R^6{}_nM'Z_{4-n}$, $M'Z_4$, $M'Z_3$, $R^7{}_nM'(—R^8—COOR^9)_{4-n}$ or $R^7{}_nM'(—R^8—COR^9)_{4-n}$, (where $R^6$ to $R^8$ may be the same or different and are each a C1 to C20 hydrocarbon group: $R^9$ is a C1 to C20 hydrocarbon group and optionally containing a carbonyl or ester group on a side chain; M' is a tin, silicon, germanium, or phosphorus atom: Z is a halogen atom: and n is an integer of 0 to 3);

(c) is a heterocumulene compound containing a Y=C=Y' bond in the molecule (where Y is a carbon, oxygen, nitrogen, or sulfur atom; and Y' is an oxygen, nitrogen, or sulfur atom);

(d) is a heterotricyclic compound having a bond represented by general formula (VI):

(where Y' is an oxygen or sulfur atom);

(e) is a halogenated isocyano compound;

(f) is a carboxylic acid, acid halide, ester, carbonic ester, or acid anhydride represented by $R^{10}$—$(COOH)_m$, $R^{11}(COZ)_m$, $R^{12}$—$(COO—R^{13})$, $R^{14}$—$OCOO—R^{15}$, $R^{16}$—$(COOCO—R^{17})_m$, or general formula (VII):

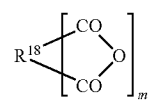

(where $R^{10}$ to $R^{18}$ may be the same or different and are each a C1 to C50 hydrocarbon group: Z is a halogen atom: and m is an integer of 1 to 5);

(g) is a carboxylic acid metal salt represented by $R^{19}{}_kM''(OCOR^{20})_{4-k}$, $R^{21}{}_kM''(OCO—R^{22}—COOR^{23})_{4-k}$, or general formula (VIII):

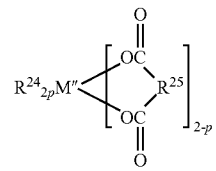

(where $R^{19}$ to $R^{25}$ may be the same or different and are each a C1 to C20 hydrocarbon group; M" is a tin, silicon, or germanium atom; and k is an integer of 0 to 3);

(h) is an N-substituted aminoketone, an N-substituted aminothioketone, an N-substituted aminoaldehyde, an N-substituted aminothioaldehyde, or a compound having a C-(=M)-N< bond in the molecule (M represents an oxygen or sulfur atom);

(i) is a compound having a N≡C— bond; and (j) is a compound having a phosphate residue represented by general formula (I):

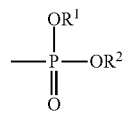

(in general formula (I), $R^1$ and $R^2$ independently represent a monovalent hydrocarbon group selected from straight or branched chain C1 to C20 alkyl groups, monovalent C3 to C20 alicyclic hydrocarbon groups and monovalent C6 to C20 aromatic hydrocarbon groups, or a hydrogen atom).

The terminal-modified conjugated diene polymer of this disclosure is prepared via the method for preparing a terminal-modified conjugated diene polymer of this disclosure.

The cis-1,4 bonding amount of the terminal-modified conjugated diene polymer is preferably 98% or more, and more preferably 98.5% or more.

The rubber composition of this disclosure contains the terminal-modified conjugated diene polymer of this disclosure.

Moreover, the tire of this disclosure uses the rubber composition of this disclosure.

Advantageous Effect

According to this disclosure, it is possible to provide a method for preparing a terminal-modified conjugated diene polymer capable of achieving an extremely high cis-1,4 bonding amount without complicated preparing conditions, and a terminal-modified conjugated diene polymer obtained via the preparing method.

In addition, by using the aforementioned terminal-modified conjugated diene polymer, the obtained rubber composition and tire are excellent in durability (fracture resistance, wear resistance and crack growth resistance).

DETAILED DESCRIPTION

<Method for Preparing a Terminal-Modified Conjugated Diene Polymer>

Hereinafter, the method for preparing a terminal-modified conjugated diene polymer of this disclosure is described in details based on its embodiments.

The method for preparing a terminal-modified conjugated diene polymer of this disclosure comprises at least a process for polymerizing a conjugated diene compound by using a polymerization catalyst composition, a process for modifying the polymer obtained via the polymerization by using a modifier, where the polymerization and the modification is performed in a one-pot way.

(Polymerization Process)

The polymerization process of this disclosure is a process for polymerizing a conjugated diene compound by using a polymerization catalyst composition, and the polymerization catalyst composition contains a rare earth element compound having at least one nitrogen atom, and a coordination compound having a cyclopentadiene skeleton.

—Polymerization Catalyst Composition—

The polymerization catalyst composition contains:

Component (A): a rare earth element compound, and

Component (D): a coordination compound having a cyclopentadiene skeleton selected from substituted or unsubstituted cyclopentadienes, substituted or unsubstituted indenes, and substituted or unsubstituted fluorenes.

In addition, the polymerization catalyst composition preferably comprises:

Component (B): at least one selected from ionic compounds and halogen compounds, and more preferably at least one selected from ionic compounds (B-1) comprising non-coordinating anions and cations, and halogen compounds (B-3) of at least one selected from organic compounds comprising active halogen and complex compounds of Lewis base and metal halide, and Lewis acid. Further, aluminoxane (B-2) may also be comprised if necessary.

Further, the polymerization catalyst composition preferably comprises:

Component (C): a compound represented by general formula (X):

(in the formula, Y is a metallic element selected from Group 1, Group 2, Group 12 and Group 13 of the Periodic Table, $R^{31}$ and $R^{32}$ are C1 to C10 hydrocarbon groups or hydrogen atom, and $R^{33}$ is a C1 to C10 hydrocarbon group; $R^{31}$, $R^{32}$ and $R^{33}$ may be the same or different to each other. In addition, in the case that Y is a metallic element selected from Group 1 of the Periodic Table, a=1 and b, c=0; in the case that Y is a metallic element selected from Group 2 and Group 12 of the Periodic Table, a, b=1 and c=0; in the case that Y is a metallic element selected from Group 13 of the Periodic Table, a, b, c=1).

Further, in the case that the polymerization catalyst composition comprises at least one selected from the aforementioned ionic compound (B-1) and the aforementioned halogen compound (B-3), it is necessary to further comprise Component (C).

Component (A) of the catalyst composition is a rare earth element compound, where this nitrogen-containing rare earth element compound is inclusive of compounds containing a rare earth element and preferably nitrogen atoms, and reactants of such compounds Lewis acids.

The aforementioned rare earth element compound is preferably a rare earth element compound represented by general formula (a-1).

(in the formula, M is scandium, yttrium or lanthanides; $(AQ)^1$, $(AQ)^2$ and $(AQ)^3$ are the same or different functional groups having M-A bonds, where A is nitrogen, oxygen or sulfur).

Moreover, from the viewpoint of improving the catalytic activity and the reaction controllability, the M is preferably gadolinium.

In the case where A is nitrogen, the functional groups represented by $AQ^1$, $AQ^2$ and $AQ^3$ (i.e., $NQ^1$, $NQ^2$ and $NQ^3$) may be amide group, etc.

The amide groups may be, for example, aliphatic amide groups such as dimethyl amide group, diethyl amide group, diisopropyl amide group, etc., aryl amide groups such as phenyl amide group, 2,6-di-tert-butylphenyl amide group, 2,6-diisopropylphenyl amide group, 2,6-dineopentyl phenyl amide group, 2-tert-butyl-6-isopropylphenyl amide group, 2-tert-butyl-6-neopentyl phenyl amide group, 2-isopropyl-6-neopentyl phenyl amide group, 2,4,6-tert-butylphenyl amide group, etc., and bistrialkylsilylamide groups such as bistrimethylsilylamide group, and, among these, from the viewpoint of the solubility to aliphatic hydrocarbons, preferred is bistrimethylsilylamide group.

Such functional groups may be used alone or in a combination of two or more.

In the case where A is oxygen, the rare earth element compound represented by general formula (a-1) (i.e., M-$(OQ^1)(OQ^2)(OQ^3)$) is not limited, and may be the following compounds (I) to (II):

a rare earth alcoholate represented by

a rare earth carboxylate represented by

Here, in each aforementioned compound (I) or (II), R is the same or different C1 to C10 alkyl groups.

Further, the Component (A) preferably does not have bonds of rare earth element and carbon, and thus the aforementioned compound (I) or compound (II) is preferably used.

In the case where A is sulfur, the rare earth element compound represented by general formula (a-1) (i.e. M-$(SQ^1)(SQ^2)(SQ^3)$) is not limited, and may be the following compounds (V)-(VI):

a rare earth alkylthiolate represented by

(V), a compound represented by

(VI), etc.

Here, in each aforementioned compound (V) or (VI), R is the same or different C1 to C10 alkyl groups.

Further, the Component (A) preferably does not have bonds of rare earth element and carbon, and thus the aforementioned compound (V) or compound (VI) is preferably used.

The Component (B) used as the aforementioned polymerization catalyst composition is at least one compound selected from the group of ionic compounds (B-1) and halogen compounds (B-3). Further, aluminoxane (B-2) may be comprised as Component (B) if necessary. The content in total of Component (B) in the aforementioned polymerization catalyst composition is preferably 0.1 to 50 times of the molar quantity of Component (A).

The ionic compound represented by the aforementioned (B-1) comprises non-coordinating anions and cations, and includes ionic compounds which may generate cationic transition metal compounds by reacting with nitrogen-containing rare-earth element compounds which corresponds to the aforementioned Component (A). Here, the non-coordinating anion may be tetravalent boron anions, for example, tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl) borate, tetra(xylyl)borate, (triphenyl,pentafluorophenyl)borate, [tris(pentafluorophenyl)phenyl]borate, tridecahydride-7,8-dicarbaundecaborate, etc. On the other hand, the cation may be carbonium cation, oxonium cation, ammonium cation, phosphonium cation, cycloheptatrienyl cation, ferrocenium cation having transition metals, etc. As specific examples of the carbonium cation, trisubstituted carbonium cations, etc. such as triphenylcarbonium cation, tri(substituted phenyl)carbonium cation, etc. are included, and specifically as the tri(substituted phenyl)carbonyl cation, tri(methylphenyl)carbonium cation, tri(dimethylphenyl) carbonium cation, etc are included. As specific examples of ammonium cation, trialkylammonium cations such as trimethylammonium cation, triethylammonium cation, tripropylammonium cation, tributylammonium cation (for example, tri(n-butyl)ammonium cation), etc.: N,N-dialkylanilinium cations such as N,N-dimethylanilinium cation, N,N-diethylanilinium cation, N,N-2,4,6-pentamethylanilinium cation: and dialkylammonium cations such as diisopropylammonium cation, dicyclohexylammonium cation, etc. are included. As specific examples of phosphonium cations, triarylphosphonium cations, etc. such as triphenylphosphonium cation, tri(methylphenyl)phosphonium cation, tri(dimethylphenyl)phosphonium cation, etc. are included. Therefore, the ionic compound is preferably a compound with ions selected and combined respectively from the aforementioned non-coordinating anions and cations, specifically N,N-dimethylanilinium tetrakis(pentafluorophenyl)borate, triphenylcarbonium tetrakis(pentafluorophenyl)borate, etc. In addition, these ionic compounds may be used alone or in a combination of two or more. Further, the content of the ionic compound in the aforementioned polymerization catalyst composition is preferably 0.1 to 10 times of the molar quantity of Component (A), and more preferably about 1 time of molar quantity of Component (A).

The aluminoxane represented by the aforementioned (B-2) is a compound obtained by rendering an organic aluminum compound and a condensing agent contact with each other, for example, a linear aluminoxane or a circular aluminoxane having a repeating unit represented by the general formula: (—Al(R')O—) (in the formula, R' is a C1 to C10 hydrocarbon group, where a part of the hydrocarbon group may be substituted with halogen atom and/or alkoxy group, and the degree of polymerization of the repeating unit is preferably 5 or more, and more preferably 10 or more). Here, R' may be specifically methyl group, ethyl group, propyl group, isobutyl group, etc., among which methyl group is preferable. In addition, the organic aluminum compound used as a material of aluminoxane may be a trialkyl aluminum such as trimethyl aluminum, triethyl aluminum, triisobutyl aluminum, etc., or a mixture thereof, and is particularly preferably trimethyl aluminum.

For example, aluminoxane using a mixture of trimethyl aluminum and tributyl aluminum as a material may be preferable used. Further, the content of aluminoxane compound in the aforementioned polymerization catalyst composition is preferable to have a elemental ratio Al/M of aluminum element Al in aluminoxane and the rare-earth element M comprised in Component (A) of about 10 to 1000.

The halogen compound represented by the aforementioned (B-3) consists of at least one of an organic compound comprising active halogen and complex compounds of Lewis base and metal halide, and Lewis acid, and may, for example, react with the nitrogen-containing rare-earth element compounds, which corresponds to the aforementioned Component (A), and generate cationic transition metal compounds, halogenated transition metal compounds or compounds with a charge-deficient transition metal center. In particular, in consideration of the stability in the air, a complex compound of metal halide and Lewis base, rather than Lewis acid, is preferably used as the halogen compound of (B-3). Further, the content in total of the halogen compound in the aforementioned polymerization catalyst composition is preferably 1 to 5 times of the molar quantity of Component (A).

As the aforementioned Lewis acid, halogen compounds comprising boron such as $B(C_6F_5)_3$, etc., halogen compounds comprising aluminum such as $Al(C_6F_5)_3$, etc., and also halogen compounds comprising elements belonging to Group 3, 4, 5, 6 or 8 of the Periodic Table may be used. Preferably, aluminum halides or organic metal halides may be used. In addition, as the halogen element, chlorine and bromine are preferable. As the aforementioned Lewis acid, in particular, methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methyl aluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, tungsten hexachloride, etc. may be used, among which diethyl aluminum chloride, ethyl aluminum sesquichloride, ethyl aluminum dichloride, diethyl aluminum bromide, ethyl aluminum sesquibromide and ethylaluminum dibromide are particularly preferable. In the case as above of using halogen compounds, compounds comprising 2 or more halogen atoms in one compound have better reactivity whereof the use amount may be reduced comparing to compounds having only one halogen atom, and is thus preferably used. For example, ethylaluminum dichloride is preferably used comparing to ethylaluminum chloride.

Examples of the metal halides contained in the complexes of the metal halides and Lewis bases include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Among them preferred are magnesium chloride, calcium chloride, barium chloride, manganese chloride, zinc chloride, and copper chloride, and particularly preferred are magnesium chloride, manganese chloride, zinc chloride, and copper chloride.

Preferred examples of the Lewis bases to form complexes with the metal halides include phosphorus compounds, carbonyl compounds, nitrogen compounds, ether compounds, and alcohols. Examples of such preferred compounds include tributyl phosphate, tri-2-ethylhexyl phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid. Versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, and lauryl alcohol. Among them more preferred are tri(2-ethylhexyl) phosphate, tricresyl phosphate, acetylacetone, 2-ethylhexanoic acid, Versatic acid, 2-ethylhexyl alcohol, 1-decanol, and lauryl alcohol.

As the organic compound comprising the aforementioned active halogen, benzyl chloride, etc. may be used.

The aforementioned polymerization catalyst composition (C) is preferably an organic metal compound represented by general formula (X):

$$YR^{31}{}_aR^{32}{}_bR^{33}{}_c \quad (X)$$

(in the formula, Y is a metallic element selected from Group 1, Group 2. Group 12 and Group 13 of the Periodic Table, $R^{31}$ and $R^{32}$ are C1 to C10 hydrocarbon groups or hydrogen atom. $R^3$ is a C1 to C10 hydrocarbon group, where $R^{31}$, $R^{32}$ and $R^{33}$ may be the same or different from each other, in addition, in the case that Y is a metallic element selected from Group 1 of the Periodic Table, a=1 and b, c=0; in the case that Y is a metallic element selected from Group 2 and Group 12 of the Periodic Table, a, b=1 and c=0; and in the case that Y is a metallic element selected from Group 13 of the Periodic Table, a, b, c=1), and is preferably an organic aluminum compound represented by general formula (Xa):

$$YR^{31}{}_aR^{32}{}_bR^{33}{}_c \quad (Xa)$$

(in the formula, $R^{31}$ and $R^{32}$ may be the same or different, including C1 to C10 hydrocarbon groups or hydrogen atom, $R^{33}$ is a C1 to C10 hydrocarbon group, and $R^{33}$ may be the same as or different from the aforementioned $R^{31}$ or $R^{32}$). As the organic aluminum compound in general formula (X), trimethyl aluminum, triethyl aluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, trioctyl aluminum; diethylaluminum hydride, di-n-propyl aluminum hydride, di-n-butyl aluminum hydride, diisobutyl aluminum hydride, dihexyl aluminum hydride, diisohexyl aluminum hydride, dioctyl aluminum hydride, diisooctyl aluminum hydride; ethyl aluminum dihydride, n-propyl aluminum dihydride, isobutyl aluminum dihydride may be used, among which triethyl aluminum, triisobutyl aluminum, diethylaluminum hydride, diisobutyl aluminum hydride are preferable. In addition, the aforementioned aluminum compound used as Component (C) may be used alone or in a combination of two or more. Further, the content of the organic aluminum compound in the aforementioned polymerization catalyst composition is preferably 1 to 50 times of the molar quantity of Composition (A), and more preferably about 10 times.

The Component (D) contained in the polymerization catalyst composition contains a coordination compound having a cyclopentadiene skeleton selected from substituted or unsubstituted cyclopentadienes, substituted or unsubstituted indenes, and substituted or unsubstituted fluorenes. Due to the effect of steric hindrance, it is possible to achieve a terminal-modified conjugated diene polymer having an extremely high cis-1,4 bonding amount at a higher yield.

Moreover, in the case of using as a co-catalyst a conventional compound a capable of becoming an anionic ligand, it was necessary to polymerize under low temperature, while in the case of using the coordination compound of the present application, due to the high solubility and the high stereocontrollability, it becomes possible to polymerize under a high temperature.

The coordination compound having a cyclopentadiene skeleton is not limited as long as having a cyclopentadiene skeleton selected from substituted or unsubstituted cyclopentadienes, substituted or unsubstituted indenes, and substituted or unsubstituted fluorenes, but from the viewpoint of the capability of obtaining a higher catalytic activity, is preferably a compound having an indenyl group. Such compound is capable of improving the activity without using toluene as the solvent during polymerization.

Here, the compound having an indenyl group may be indene, 1-methyl indene, 1-ethyl indene, 1-benzyl indene, 2-phenyl indene, 2-methyl indene, 2-ethyl indene, 2-benzyl indene, 3-methyl indene, 3-ethyl indene, 3-benzyl indene, etc.

The catalyst composition is prepared by, for example, dissolving the components (A) to (D) in a solvent.

The order of the addition of these components is not limited. In view of high polymerization activity and short polymerization induction time, it is preferred that these components be preliminarily mixed, allowed to react, and aged. The ageing temperature is typically about 0 to 100° C. and preferably 20 to 80° C. Below 0° C., aging may be insufficient. Above 100° C., catalytic activity may decrease and the molecular weight distribution may become broad. The aging time is not limited, and can be carried out by contact in the line before feeding into a polymerization reactor. In general, aging can be achieved for at least 0.5 minutes and the resulting catalyst is stable for several days.

—Polymerization Method—

The polymerization method is not limited as long as the reactants are invested in order (performed in a one-pot way) into the reaction system. As the polymerization method, any one selected from solution polymerization, suspension polymerization, liquid phase bulk polymerization, emulsion polymerization, gas phase polymerization process, solid phase polymerization, etc. may be used. In addition, in the case of using a solvent in the polymerization reaction, the used solvent may be any type that is inactive in the polymerization reaction. For example, normal hexane, toluene, cyclohexane or a mixture thereof are included, and in view of the environmental load and the cost, cyclohexane, normal hexane or a mixture are preferably used.

In addition, in the polymerizing process, a polymerization terminator such as methanol, ethanol, isopropanol, etc. may be used to terminate the polymerization.

In the polymerizing process, the polymerization reaction of conjugated diene compound is preferably performed in an atmosphere of inactive gas, preferably nitrogen gas or argon gas. The polymerization temperature of polymerization reaction is not limited, but is preferably selected in the range of −100° C. to 300° C., and may also be set to around room temperature. Further, if the polymerization temperature is raised, the cis-1,4 selectivity of the polymerization reaction may be reduced. In addition, in order to bring sufficient conjugated diene compound into the polymerization reaction system, the pressure of the polymerization reaction is preferably 0.1 to 10.0 MPa. In addition, the reaction time of the polymerization reaction is not limited, and is preferably, for example, 1 second to 10 days, which may also be selected appropriately according to conditions such as catalyst type and polymerization temperature.

(Terminal Modification Process)

The terminal modification process of this disclosure is a process for modifying the polymer obtained via the polymerization process by using a modifier. This terminal modification process is performed in the same reaction system as the polymerization process (performed in a one-pot way).

In the modifier used in the terminal modification process, the polymer having the active organic metal site is allowed to react with a compound having a functional group capable of substitution or addition reaction with the active organic metal site and not containing an active proton that deactivates the active organic metal site, thereby the functional group is incorporated to the polymer or the molecular weight is increased by coupling.

A representative modifier preferably has at least one functional group selected from the group consisting of an azacyclopropane group, ketone groups, carboxyl groups, thiocarboxyl groups, carbonates, carboxylic anhydrides, carboxylic acid metal salts, acid halides, urea groups, thiourea groups, amido groups, thioamido groups, isocyanate groups, thioisocyanate groups, halogenated isocyano groups, epoxy groups, thioepoxy groups, imino groups, and a M-Z bond (where M is Sn, Si, Ge, or P, and Z is a halogen atom) and preferably contains no active proton nor onium salt that deactivates the active organic metal site.

Specifically, the modifier is preferably at least one selected from the following compounds (a) to (j).

The compound (a) is a compound represented by general formula (V).

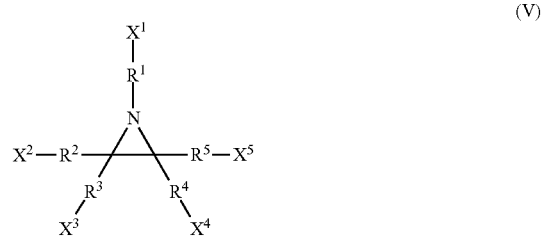

In the formula above, $X^1$ to $X^5$ are each a monovalent functional group containing at least one selected from the group consisting of a hydrogen atom, a halogen atom, carbonyl groups, thiocarbonyl groups, isocyanate groups, thioisocyanate groups, epoxy groups, thioepoxy groups, halogenated silyl groups, hydrocarbyloxysilyl groups, and sulfonyloxy groups and not containing an active proton or onium salt. $X^1$ to $X^5$ may be the same or different with the provizo that at least one of them is not a hydrogen atom.

$R^1$ to $R^5$ each independently represents a single bond or a divalent C1 to C18 hydrocarbon group. Examples of the divalent hydrocarbon group include C1 to C18 alkylene groups, C2 to C18 alkenylene groups, C6 to C18 arylene groups, C7 to C18 and aralkylene groups. Among them, preferred are C1 to C18 alkylene groups, and particularly C1 to C10 alkylene groups. The alkylene groups may be linear, branched, or cyclic. In particular, linear groups are preferred. Examples of the linear alkylene groups include a methylene group, ethylene group, trimethylene group, tetramethylene group, pentamethylene group, hexamethylene group, octamethylene group, and decamethylene group.

Alternatively, a plurality of aziridine rings may be bonded via any of $X^1$ to $X^5$ and $R^1$ to $R^5$.

Moreover, the modifier preferably do not simultaneously satisfy $X^1$=hydrogen atom and $R^1$=single bond in the general formula (V).

Examples of the modifier represented by the general formula (V) include, but is not limited to, 1-acetylaziridine, 1-propionylaziridine, 1-butyrylaziridine, 1-isobutyrylaziridine, 1-valerylaziridine, 1-isovalerylaziridine, 1-pivaloylaziridine, 1-acetyl-2-methylaziridine, 2-methyl-1-propionylaziridine, 1-butyryl-2-methylaziridine, 2-methyl-1-isobutyrylaziridine, 2-methyl-1-valerylaziridine, 1-isovaleryl-2-methylaziridine, 2-methyl-1-pivaloylaziridine, ethyl 3-(1-aziridinyl)propionate, propyl 3-(1-aziridinyl)propionate, butyl 3-(1-aziridinyl)propionate, ethylene glycol bis[3-(1-aziridinyl)propionate], trimethylolpropane tris[3-(1-aziridinyl)propionate], ethyl 3-(2-methyl-1-aziridinyl)propionate, propyl 3-(2-methyl-1-aziridinyl)propionate, butyl 3-(2-methyl-1-aziridinyl)propionate, ethylene glycol bis[3-(2-methyl-1-aziridinyl)propionate], trimethylolpropane tris[3-(2-methyl-1-aziridinyl)propionate], neopentyl glycol bis[3-(1-aziridinyl)propionate], neopentyl glycol bis[3-(2-methyl-1-aziridinyl)propionate], di(1-aziridinylcarbonyl)methane, 1,2-di(1-aziridinylcarbonyl)ethane, 1,3-di(1-aziridinylcarbonyl)propane, 1,4-di(1-aziridinylcarbonyl)butane, 1,5-di(1-aziridinylcarbonyl)pentane, di(2-methyl-1-aziridinylcarbonyl)methane, 1,2-di(2-methyl-1-aziridinylcarbonyl)ethane, 1,3-di(2-methyl-1-aziridinylcarbonyl)propane, and 1,4-di(2-methyl-1-aziridinylcarbonyl)butane.

The compound (b) is a halogenated organic metal compound or halogenated metal compound represented by $R^6_n M'Z_{4-n}$ or $M'Z_4$, $M'Z_3$.

(where $R^6$ is a same or different C1 to C20 hydrocarbon group: M' is a tin atom, silicon atom, germanium atom, or phosphorus atom: Z is a halogen atom; n is an integer of 0 to 3)

When M' is a tin atom in the formula above, examples of the compound (b) include triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride, and tin tetrachloride.

When M' is a silicon atom in the formula above, examples of the compound (b) include triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyldichlorosilane, phenylchlorosilane, hexyltridichlorosilane, octyltrichlorosilane, butyltrichlorosilane, methyltrichlorosilane, and silicon tetrachloride.

When M' is a germanium atom in the formula above, examples of the compound (b) include triphenylgermanium chloride, dibutylgermanium dichloride, diphenylgermanium dichloride, butylgermanium trichloride, and germanium tetrachloride. When M' is a phosphorus atom in the formula (V), examples of the compound (b) include phosphorus trichloride.

The modifier compound (b) may be an organic metal compound containing an ester group represented by the following formula or a carbonyl group represented by the following formula in the molecule:

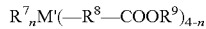

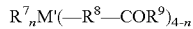

(where $R^7$ to $R^8$ may be the same or different and are each a C1 to C20 hydrocarbon group; $R^9$ is a C1 to C20 hydrocarbon group and may contain a carbonyl or ester group in the side chain; M' is a tin, silicon, germanium, or phosphorus atom; Z is a halogen atom; and n is an integer of 0 to 3).

These compounds (b) may be used in combination in any proportion.

The compound (c) is a heterocumulene compound, and is a modifier having $Y=C=Y'$ bond in the molecule.

In the formula above, Y is a carbon atom, oxygen atom, nitrogen atom, or sulfur atom, Y' is an oxygen atom, nitrogen atom, or sulfur atom. When Y is a carbon atom and when Y' is an oxygen atom, the component (c) is a ketene compound. When Y is a carbon atom and when Y' is a sulfur atom, the component (c) is a thioketene compound. When Y is a nitrogen atom and when Y' is an oxygen atom, the compound (c) is an isocyanate compound. When Y is a nitrogen atom and when Y' is a sulfur atom, the component (c) is a thioisocyanate compound. When both Y and Y' are nitrogen atoms, the component (c) is a carbodiimide compound. When both Y and Y' are oxygen atoms, the component (c) is carbon dioxide. When Y is an oxygen atom and when Y' is a sulfur atom, the component (c) is carbonyl sulfide. When both Y and Y' are sulfur atoms, the component (c) is carbon disulfide. The compound (c), however, should not be limited to these combinations.

Examples of the ketene compounds include ethylketene, butylketene, pnenylketene, and tolylketene. Examples of the thioketene compounds include ethylene thioketene, butylthioketene, phenylthioketene, and tolylthioketene. Examples of the isocyanate compounds include phenyl isocyanate, 2,4-tolylene diisocyanate, 2,6-tolylene diisocyanate, diphenyl methane diisocyanate, polymeric-type diphenyl methane diisocyanate, and hexamethylene diisocyanate. Examples of the thioisocyanate compounds include phenyl thioisocyanate, 2,4-tolylene dithioisocyanate, and hexamethylene dithioisocyanate. Examples of the carbodiimide compounds includes N,N'-diphenylcarbodiimide and N,N'-ethylcarbodiimide.

The compound (d) is a heterotricyclic compound having the bond represented by the following formula (VI):

(where Y' is an oxygen atom or sulfur atom).

When Y' is an oxygen atom, the component (d) is an epoxy compound. When Y' is a sulfur atom, the component (d) is a thiirane compound. Examples of the epoxy compound include ethylene oxide, propylene oxide, cyclohexene oxide, styrene oxide, epoxidized soybean oil, and epoxidized natural rubber. Examples of the thiirane compound include thiirane, methylthiirane, and phenylthiirane.

The compound (e) is a halogenated isocyano compound.
The a halogenated isocyano compound has the bond represented by the following formula:

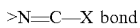

(where X is a halogen atom).

Examples of the halogenated isocyano compounds, as the compound (e), include 2-amino-6-chloropyridine, 2,5-dibromopyridine, 4-chloro-2-phenylquinazoline, 2,4,5-tribromoimidazole, 3,6-dichloro-4-methylpyridazine, 3,4,5-trichloropyridazine, 4-amino-6-chloro-2-mercaptopyrimidine, 2-amino-4-chloro-6-methylpyrimidine, 2-amino-4,6-dichloropyrimidine, 6-chloro-2,4-dimethoxypyrimidine, 2-chloropyrimidine, 2,4-dichloro-6-methylpyrimidine, 4,6-dichloro-2-(methylthio)pyrimidine, 2,4,5,6-tetrachloropyrimidine, 2,4,6-trichloropyrimidine, 2-amino-6-chloropyrazine, 2,6-dichloropyrazine, 2,4-bis(methylthio)-6-chloro-1,3,5-triazine, 2,4,6-trichloro-1,3,5-triazine, 2-bromo-5-nitrothiazole, 2-chlorobenzothiazole, and 2-chlorobenzooxazole.

The compound (f) include carboxylic acids, acid halides, ester compounds, carbonic ester compounds, or acid anhydrides having the structure represented by $R^{10}$—$(COOH)_m$, $R^{11}(COZ)_m$, $R^{12}$—$(COO$—$R^{13})$, $R^{14}$—$OCOO$—$R^{15}$, $R^{16}$—$(COOCO$—$R^{17})_m$ or general formula (VII).

(where $R^{10}$ to $R^{18}$ may be the same or different and are each a C1 to C50 hydrocarbon group; Z is a halogen atom: and m is an integer of 1 to 5).

Examples of the carboxylic acids of the compound (f) include acetic acid, stearic acid, adipic acid, maleic acid, benzoic acid, acrylic acid, methacrylic acid, phthalic acid, isophthalic acid, terephthalic acid, trimellitic acid, pyromellitic acid, mellitic acid, and complete or partial hydrolysis products of polymethacrylic ester compounds or polyacrylic acid compounds.

Examples of acid halides of the compound (f) include acetyl chloride, propionyl chloride, butanoyl chloride, isobutanoyl chloride, octanoyl chloride, acryl chloride, benzoyl chloride, stearoyl chloride, phthaloyl chloride, maloyl chloride, oxaloyl chloride, acetyl iodide, benzoyl iodide, acetyl fluoride, and benzoyl fluoride.

Examples of ester compounds in the compound (f) include ethyl acetate, ethyl stearate, ethyl adipate, diethyl maleate, methyl benzoate, ethyl acrylate, ethyl methacrylate, diethyl phthalate, dimethyl terephthalate, tributyl trimellitate, tetraoctyl pyromellitate, hexaethyl mellitate, phenyl acetate, poly(methyl methacrylate), poly(ethyl acrylate), and poly(isobutyl acrylate). Examples of carbonic ester compounds include dimethyl carbonate, diethyl carbonate, dipropyl carbonate, dihexyl carbonate, and diphenyl carbonate. Examples of the acid anhydrides include intermolecular acid anhydrides, such as acetic anhydride, propionic anhydride, propionic anhydride, valeric anhydride, heptanoic anhydride, benzoic anhydride, and cinnamic anhydride; and intramolecular acid anhydrides, such as succinic anhydride, methylsuccinic anhydride, maleic anhydride, glutaric anhydride, citraconic anhydride, phthalic anhydride, and styrene-maleic anhydride copolymers.

The compounds of the compound (f) may contain aprotic polar groups, such as an ether group and tertiary amino group in the coupling agent molecule within the scope of this disclosure. The compounds (f) may be used alone or in combination of two or more. The compound (f) may contain compounds having a free hydroxyl group or phenol group as impurities. The compounds (f) may be used alone or in combination of two or more. The component (f) may contain compounds having a free hydroxyl group or phenol group as impurities.

The compound (g) includes carboxylic acid metal salts represented by $R^{19}{}_kM''(OCOR^{20})_{4-k}$, $R^{21}{}_kM''(OCO-R^{22}-COOR^{23})_{4-k}$, or general formula (VIII):

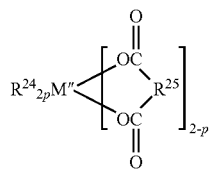

(VIII)

(where $R^{19}$ to $R^{25}$ may be the same or different and are each a C1 to C20 hydrocarbon group: M″ is a tin, silicon, or germanium atom; and k is an integer of 0 to 3).

The $R^{19}{}_kM''(OCOR^{20})_{4-k}$ in the compound (g) include triphenyltin laurate, triphenyltin 2-ethylhexanoate, triphenyltin naphthenate, triphenyltin acetate, triphenyltin acrylate, tri-n-butyltin laurate, tri-n-butyltin 2-ethylhexanoate, tri-n-butyltin naphthenate, tri-n-butyltin acetate, tri-n-butyltin acrylate, tri-t-butyltin laurate, tri-t-butyltin 2-ethylhexanoate, tri-t-butyltin naphthenate, tri-t-butyltin acetate, tri-t-butyltin acrylate, triisobutyltin laurate, triisobutyltin 2-ethylhexanoate, triisobutyltin naphthenate, triisobutyltin acetate, triisobutyltin acrylate, triisopropyltin laurate, triisopropyltin 2-ethylhexanoate, triisopropyltin naphthenate, triisopropyltin acetate, triisopropyltin acrylate, trihexyltin laurate, trihexyltin 2-ethylhexanoate, trihexyltin acetate, trihexyltin acrylate, trioctyltin laurate, trioctyltin 2-ethylhexanoate, trioctyltin naphthenate, trioctyltin acetate, trioctyltin acrylate, tri(2-ethylhexyl)tin laurate, tri(2-ethylhexyl)tin 2-ethylhexanoate, tri(2-ethylhexyl)tin naphthenate, tri(2-ethylhexyl)tin acetate, tri(2-ethylhexyl)tin acrylate, tristearyltin laurate, tristearyltin 2-ethylhexanoate, tristearyltin naphthenate, tristearyltin acetate, tristearyltin acrylate, tribenzyltin laurate, tribenzyltin 2-ethylhexanoate, tribenzyltin naphthenate, tribenzyltin acetate, tribenzyltin acrylate, diphenyltin dilaurate, diphenyltin di-2-ethylhexanoate, diphenyltin distearate, diphenyltin dinaphthenate, diphenyltin diacetate, diphenyltin diacrylate, di-n-butyltin dilaurate, di-n-butyltin di-2-ethylhexanoate, di-n-butyltin distearate, din-butyltin dinaphthenate, di-n-butyltin diacetate, di-n-butyltin diacrylate, di-t-butyltin dilaurate, di-t-butyltin di-2-ethylhexanoate, di-t-butyltin distearate, di-t-butyltin dinaphthenate, di-t-butyltin diacetate, di-t-butyltin diacrylate, diisobutyltin dilaurate, diisobutyltin di-2-ethylhexanoate, diisobutyltin distearate, diisobutyltin dinaphthenate, diisobutyltin diacetate, diisobutyltin diacrylate, diisopropyltin dilaurate, diisopropyltin di-2-ethylhexanoate, diisopropyltin distearate, diisopropyltin dinaphthenate, diisopropyltin diacetate, diisopropyltin diacrylate, dihexyltin dilaurate, dihexyltin di-2-ethylhexanoate, dihexyltin distearate, dihexyltin dinaphthenate, dihexyltin diacetate, dihexyltin diacrylate, di(2-ethylhexyl)tin dilaurate, di(2-ethylhexyl)tin di-2-ethylhexanoate, di(2-ethylhexyl)tin distearate, di(2-ethylhexyl)tin dinaphthenate, di(2-ethylhexyl)tin diacetate, di(2-ethylhexyl)tin diacrylate, dioctyltin dilaurate, dioctyltin di-2-ethylhexanoate, dioctyltin distearate, dioctyltin dinaphthenate, dioctyltin diacetate, dioctyltin diacrylate, distearyltin dilaurate, distearyltin di-2-ethylhexanoate, distearyltin distearate, distearyltin dinaphthenate, distearyltin diacetate, distearyltin diacrylate, dibenzyltin dilaurate, dibenzyltin di-2-ethylhexanoate, dibenzyltin distearate, dibenzyltin dinaphthenate, dibenzyltin diacetate, dibenzyltin diacrylate, phenyltin trilaurate, phenyltin tri-2-ethylhexanoate, phenyltin trinaphthenate, phenyltin triacetate, phenyltin triacrylate, n-butyltin trilaurate, n-butyltin tri-2-ethylhexanoate, n-butyltin trinaphthenate, n-butyltin triacetate, n-butyltin triacrylate, t-butyltin trilaurate, t-butyltin tri-2-ethylhexanoate, t-butyltin trinaphthenate, t-butyltin triacetate, t-butyltin triacrylate, isobutyltin trilaurate, isobutyltin tri-2-ethylhexanoate, isobutyltin trinaphthenate, isobutyltin triacetate, isobutyltin triacrylate, isopropyltin trilaurate, isopropyltin tri-2-ethylhexanoate, isopropyltin trinaphthenate, isopropyltin triacetate, isopropyltin triacrylate, hexyltin trilaurate, hexyltin tri-2-ethylhexanoate, hexyltin trinaphthenate, hexyltin triacetate, hexyltin triacrylate, octyltin trilaurate, octyltin tri-2-ethylhexanoate, octyltin trinaphthenate, octyltin triacetate, benzyltin triacrylate, 2-ethylhexyltin trilaurate, 2-ethylhexyltin tri-2-ethylhexanoate, 2-ethylhexyltin trinaphthenate, 2-ethylhexyltin triacetate, 2-ethylhexyltin triacrylate, stearyltin trilaurate, stearyltin tri-2-ethylhexanoate, stearyltin trinaphthenate, stearyltin triacetate, stearyltin triacrylate, benzyltin trilaurate, benzyltin tri-2-ethylhexanoate, benzyltin trinaphthenate, benzyltin triacetate, and benzyltin triacrylate.

The $R^{21}{}_kM''(OCO-R^{22}-COOR^2)_{4-k}$ in the compound (g) include diphenyltin bismethylmalate, diphenyltin bis-2-ethylhexanoate, diphenyltin bisoctylmalate, diphenyltin bisoctylmalate, diphenyltin bisbenzylmalate, di-n-butyltin bismethylmalate, di-n-butyltin bis-2-ethylhexanoate, di-n-butyltin bisoctylmalate, di-n-butyltin bisbenzylmalate, di-t-butyltin bismethylmalate, di-t-butyltin bis-2-ethylhexanoate, di-t-butyltin bisoctylmalate, di-t-butyltin bisbenzylmalate, diisobutyltin bismethylmalate, diisobutyltin bis-2-ethylhexanoate, diisobutyltin bisoctylmalate, diisobutyltin bisbenzylmalate, diisopropyltin bismethylmalate, diisopropyltin bis-2-ethylhexanoate, diisopropyltin bisoctylmalate, diisopropyltin bisbenzylmalate, dihexyltin bismethylmalate, dihexyltin bis-2-ethylhexanoate, dihexyltin bisoctylmalate, dihexyltin bisbenzylmalate, di-2-ethylhexyltin bismethylmalate, di-2-ethylhexyltin bis-2-ethylhexanoate, di-2-ethylhexyltin bisoctylmalate, di-2-ethylhexyltin bisbenzylmalate, dioctyltin bismethylmalate, dioctyltin stearyltin trilaurate, stearyltin tri-2-ethylhexanoate, stearyltin trinaphthenate, stearyltin triacetate, stearyltin triacrylate, benzyltin trilaurate, benzyltin tri-2-ethylhexanoate, benzyltin trinaphthenate, benzyltin triacetate, and benzyltin triacrylate.

Examples of the compounds represented by the formula (VIII) include diphenyltin malate, di-n-butyltin malate, di-t-butyltin malate, diisobutyltin malate, diisopropyl tin malate, dihexyltin malate, di-2-ethylhexyltinmalate, dioctyltin malate, distearyltin malate, dibenzyltin malate, diphenyltin adipate, di-n-butyltin adipate, di-t-butyltin adipate, diisobutyltin adipate, diisopropyltin adipate, dihexyltin diacetate, di-2-ethylhexyltin adipate, dioctyltin adipate, distearyltin adipate, and dibenzyltin adipate.

The compound (h) includes N-substituted aminoketones, N-substituted aminothioketones, N-substituted aminothioketones, N-substituted aminoaldhydes, N-substituted aminothioaldhydes, and a compound having a —C-(=M)-N< bond (M represents an oxygen or sulfur atom) in its molecule.

Examples of the compound (h) include N-substituted aminoketones and corresponding N-aminothioketones, such as 4-dimethylaminoacetophenone, 4-diethylaminoacetophenone, 1,3-bis(diphenylamino)-2-propanone, 1,7-bis(methylethylamino)-4-heptanone, 4-dimethylaminobenzophenone, 4-di-t-butylaminobenzophenone, 4-diphenylaminobenzophenone, 4,4'-bis(dimethylamino)benzophenone, 4,4'-bis(diethylamino)benzophenone, and 4,4'-bis(diphenylamino) benzophenone; N-substituted aminoaldhydes and corresponding N-substituted aminothioaldhydes, such as 4-(dimethylamino)benzaldehyde, 4-diphenylaminobenzaldehyde, and 4-divinylaminobenzaldehyde; compounds having a —C-(=M)-N< bond (M represents an oxygen or sulfur atom) in their molecules such as N-substituted lactams and corresponding N-substituted thiolactams, e.g. N-methyl-β-propiolactam, N-phenyl-β-propiolactam, N-methyl-2-pyrrolidone, N-phenyl-2-pyrrolidone, N-t-butyl-2-pyrrolidone, N-phenyl-5-methyl-2-pyrrolidone, N-methyl-2-piperidone, N-phenyl-2-piperidone, N-methyl-ε-caprolactam, N-phenyl-ε-caprolactam, N-methyl-ω-caprolactam, N-phenyl-ω-caprolactam, N-methyl-ω-laurylolactam, and N-vinyl-ω-laurylolactam; and N-substituted cyclic ureas and corresponding N-substituted cyclic thioureas, such as 1,3-dimethylethyleneurea, 1,3-divinylethyleneurea, 1,3-diethyl-2-imidazolidinone, 1-methyl-3-ethyl-2-imidazolidinone, and 1,3-dimethyl-2-imidazolidinone.

The compound (i) is a compound having a N≡C— bond. Here, the compound having a N≡C— bond may be organic cyano compounds represented by the general formula R—CN, specifically, 2-cyano pyridine, 3-cyano pyridine, acrylonitrile, etc.: electrophilic compounds represented by ketone, aldehyde, epoxy, specifically, benzaldehyde, benzophenone, 4-4'-bis(diethylamino)benzophenone, 3-glycidopropyl trimethoxysilane, aryl glycidyl ether; organic compounds having a vinyl group, specifically, propylene, 1-butene, 1-hexene, styrene, vinylnaphthalene, vinyl phosphate, vinyl acetate, vinyl pivaloylate, vinyl trimethyl silane, triethoxyvinylsilane, etc.

The compound (j) is a compound having a phosphate residue represented by general formula (I):

(in general formula (I), $R^1$ and $R^2$ independently represent a monovalent hydrocarbon group selected from straight or branched chain C1 to C20 alkyl groups, monovalent C3 to C20 alicyclic hydrocarbon groups and monovalent C6 to C20 aromatic hydrocarbon groups, or a hydrogen atom).

More specifically, for example, phosphate residues represented by general formula (II) may be used.

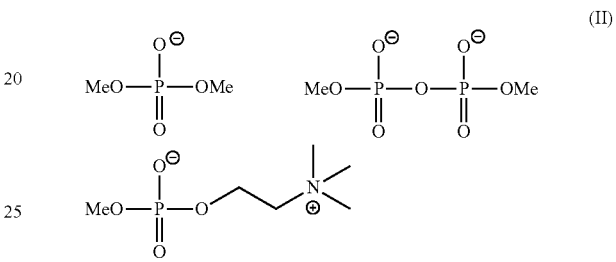

These compounds (a) to (h) may be used alone or in combination of two or more, and may also be used in a combination with a modifier other than the compounds (a) to (h).

The modification reaction in this disclosure may be either liquid-phase reaction or solid-phase reaction. The liquid-phase reaction is preferred (a solution containing unreacted monomer used in the polymerization may be used). Any type of the modification reaction can be employed without limitation. For example, batch reactors or continuous reactors such as multi-stage continuous reactors and in-line mixers can be used. The modification reaction after the polymerization reaction is preferably carried out before necessary processes such as solvent removal, aqueous treatment, thermal treatment, and polymer isolation.

The temperature of the modification reaction may be the same as that of the polymerization temperature of the conjugated diene polymer. The preferred temperature range is 20 to 100° C. A temperature below this range causes the viscosity of the polymer to increase, whereas a temperature above this range accelerates undesirable deactivation of the polymer active terminals.

The amount of the modifier used to the component (A) of the polymerization catalyst composition is in the range of preferably 0.1 to 100 and more preferably 1.0 to 50 on the molar basis, although the amount depends on the terminal modification efficiency of the resulting modified polymer. Such a range on the amount of the modifier promotes the modification reaction that can prepare a polymer not containing a toluene-insoluble component (gel) and exhibiting low heat build-up and high wear resistance.

This modification reaction is typically carried out with stirring at room temperature to 100° C. for preferably 0.5 minutes to 2 hours and more preferably 3 minutes to 1 hour. A conjugated diene polymer having a high terminal modification efficiency can be prepared by polymerization using a catalyst under polymerization conditions for achieving high terminal living rate followed by terminal modification reaction.

<Terminal-Modified Conjugated Diene Polymer>

The terminal-modified conjugated diene polymer according to this disclosure is a polymer prepared via the aforementioned preparing method of this disclosure.

Here, the "terminal-modified conjugated diene polymer" refers to a polymer obtained by modifying terminals of a polymer obtained by polymerizing a conjugated diene compound (for example, 1,3-butadiene, isoprene, etc.) as a monomer.

The cis-1,4 bonding amount of the terminal-modified conjugated diene polymer is ordinarily 95% or more, preferably 98% or more, and more preferably 98.5% or more.

By setting the cis-1,4 bonding amount to be 95% or more, the orientation of the polymer chain would be improved, and the generation of strain-induced crystallizability would become sufficient; further, by setting the same to be 98% or more, or 98.5% or more, it is possible to generate a sufficient strain-induced crystallizability to obtain a higher durability.

The 1,2-vinyl bonding amount of the terminal-modified conjugated diene polymer is preferably 2% or less, and more preferably 1% or less.

By setting the 1,2-vinyl bonding amount to be 2% or less, the strain-induced crystallizability would become less vulnerable to interference.

The number average molecular weight (Mn) of the terminal-modified conjugated diene polymer is preferably set 400,000 or more, and more preferably set 500,000 or more.

<Rubber Composition>

The rubber composition of this disclosure comprises at least rubber components, and may further comprise other components such as filler, crosslinking agent, etc., depending on the purpose. Further, the rubber components contain at least the terminal-modified conjugated diene polymer prepared via the preparing method of this disclosure.

The content of the terminal-modified conjugated diene polymer in the rubber components is not limited, and may be selected appropriately depending on the purpose, which is preferably 15 mass % to 100 mass %.

By setting the content of the terminal-modified conjugated diene polymer in the rubber components to be 15 mass % or more, the properties of the terminal-modified conjugated diene polymer can be achieved sufficiently.

The type of the conjugated diene compound is not limited, and may be selected appropriately depending on the purpose; for example, isoprene rubber (BR), styrene-butadiene rubber (SBR), acrylonitrile-butadiene rubber (NBR), etc. may be used.

Moreover, in addition to the conjugated diene compound, other rubber components such as chloroprene rubber, ethylene-propylene rubber (EPM), ethylene-propylene-nonconjugated diene rubber (EPDM), polysulfide rubber, silicone rubber, fluororubber, urethane rubber, isoprene copolymer and the like may be blended into the rubber components as well. The rubber components above may be used singly or in a combination of two or more.

The filler is not limited, and may be selected appropriately depending on the purpose; for example, carbon black, inorganic filler, etc. may be used, and at least one selected from carbon black and inorganic filler is preferably used. Here, the rubber composition is more preferable to comprise carbon black. Further, the filler is compound to the rubber composition in order to improve the reinforcing properties, etc.

The content of the filler is not limited, and may be selected appropriately depending on the purpose: with respect to 100 parts by mass of rubber component, 10 parts by mass to 100 parts by mass is preferable, 20 parts by mass to 80 parts by mass is more preferable, and 30 parts by mass to 60 parts by mass is even more preferable.

By setting the content of the filler to be 10 parts by mass or more, the effect of adding filler is observed, and by setting the same to be 100 parts by mass or less, it is possible to mix the filler into the rubber component, and it is possible to improve the performance as a rubber composition.

On the other hand, by setting the content of the filler to be within the more preferable range, or the even more preferable range, the balance between workability and low loss property and between workability and durability would be improved.

The inorganic filler is not limited, and may be selected appropriately depending on the purpose: for example, silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, barium sulfate, etc. may be used. The inorganic fillers above may be used singly or in a combination of two or more.

Further, when using an inorganic filler, a silane coupling agent may also be used appropriately.

The crosslinking agent is not limited, and may be selected appropriately depending on the purpose; for example, sulfur-based crosslinking agent, organic peroxide-based crosslinking agent, inorganic crosslinking agent, polyamine crosslinking agent, resin crosslinking agent, sulfur compound-based crosslinking agent, oxime-nitrosamine-based crosslinking agent, etc. may be used, whereamong sulfur-based crosslinking agent is more preferable for a rubber composition for tire.

The content of the crosslinking agent is not limited, and may be selected appropriately depending on the purpose: with respect to 100 parts by mass of rubber components, 0.1 part by mass to 20 parts by mass is preferable.

If the content of the crosslinking agent is less than 0.1 parts by mass, the crosslinking would not progress sufficiently, and if the content is more than 20 parts by mass, there would be a tendency that the crosslinking progresses during the kneading due to a part of the crosslinking agent, causing a loss of the physical properties of the crosslinking substance.

The rubber composition of the present invention may be also used with vulcanization accelerators in addition: as the vulcanization accelerator, compounds which are guanidine-based, aldehyde-amine-based, aldehyde-ammonia-based, thiazole-based, sulfenamide-based, thiourea-based, thiuram-based, dithiocarbamate-based, xanthate-based, etc. may be used.

In addition, depending on the purpose, conventional means such as softening agent, vulcanization assistant, colorant, flame retardant, lubricant, foaming agent, plasticizer, processing aid, antioxidant, age resister, anti-scorch agent, ultraviolet rays protecting agent (ultraviolet inhibitor), anti-static agent, color protecting agent, and other compounding agents may be used depending on the purpose.

The rubber composition of the present invention may be subjected to crosslinking and used as a crosslinking rubber composition. The crosslinking rubber composition may be of any type that is obtained by crosslinking the rubber composition of the present invention, which is not limited, and may be selected appropriately depending on the purpose.

The crosslinking condition is not limited, and may be selected appropriately depending on the purpose: a temperature of 120° C. to 200° C. and a heating time of 1 minute to 900 minutes are preferable.

<Tire and Other Usages>

The tire of this disclosure uses the rubber composition of this disclosure.

The tire may be of any type that uses the crosslinking rubber composition obtained by crosslinking the rubber composition of the present invention, which is not limited, and may be selected appropriately depending on the purpose.

The applying position on the tire of the rubber composition of this disclosure is not limited, and may be selected appropriately depending on the purpose: for example, rubber members such as tread, base tread, sidewall, side-reinforcing rubber and bead filler may be used.

Among the above, by setting a tread as the applying position, it would be advantageous to the durability.

Conventional methods may be used as the method for producing the tire. For example, a green tire is obtained by pasting overlappingly in sequence members normally used for producing tires such as carcass layer, belt layer, tread layer, etc. consisting unvulcanized rubber and/or cord on the tire molding drum, and then removing the drum. Next, a desired tire (for example, a pneumatic tire) may be produced by subjecting the green tire to heating vulcanization according to a conventional method.

Besides the usage in tire, the rubber composition of this disclosure may also be used in vibration-proof rubber, seismic isolation rubber, belt (conveyor belt), rubber crawler, various hoses, etc.

EXAMPLES

The present invention will be explained in further detail below according to examples, although the present invention is not limited to the disclosed examples.

Examples 1 to 8

A sufficiently dried 1000 ml pressure-resistant grass reactor was subjected to nitrogen substitution, and was added 400 ml of a hexane solution containing 70 g of 1,3-butadiene. On the other hand, in a glovebox in a nitrogen atmosphere, 50.4 µmol of bis(2-phenylindenyl)gadolinium bis(dimethylsilylamide) [(2-PhC$_9$H$_6$)$_2$GdN(SiHMe$_2$)$_2$], 100 µmol of 3-benzyl indene, 750 µmol of DIBAL (diisobutyl aluminum hydride), 1 ml of TMAO (made by Tosoh Corporation), and 100 µL of DEAC (diethyl aluminum chloride) were added into a glass container at a predetermined amount, and were dissolved in 30 ml of n-Hex to obtain a catalyst solution. Then, the catalyst solution was taken out from the glovebox, and 40 µmol of the catalyst solution in terms of gadolinium was added to the monomer solution, and was then subjected to polymerization at 50° C. for 40 minutes. After polymerization, the modifiers according to Table 1 were invested and were reacted for 1 hour. Then, samples of polymer were obtained by adding 1 mL of an isopropanol solution with 5 mass % of 2,2'-methylene-bis (4-ethyl-6-t-butylphenol) (NS-5) to stop the reaction, and separating the polymer with a large amount of IPA (isopropanol) and vacuum drying the same at 60° C.

Here, the yield of each obtained sample of polymer was 66 g.

Examples 9 to 16

As the conjugated diene compound, except that 70 g of isoprene was used instead of 70 g of 1,3-butadiene, samples of polymer were obtained at the same conditions as Examples 1 to 8. The yield of each obtained sample of polymer was 66 g.

The types of the used modifiers were as shown in Table 2.

Examples 17 and 18

Samples of polymer were obtained at the same conditions as Examples 1 to 8, except that as for Example 17. 50.4 µmol of gadolinium tri(tert-butoxide) [Gd(OtBu)$_3$] was used as the rare earth element compound of the polymerization catalyst composition, and as for Example 18, 50.4 µmol of gadolinium tri(tert-butoxide) [Gd(StBu)$_3$] was used as the rare earth element compound of the polymerization catalyst composition. The yield of each obtained sample of polymer was 66 g.

The types of the used modifiers were as shown in Table 2.

<Evaluation>

(1) Evaluation of Polymer

With respect to the obtained samples of polymer of each example, the modification efficiency, the cis-1,4 bonding amount, the weight average molecular weight (Mw) and the molecular weight distribution (MWD) were measured. The obtained results were as shown in Table 1 and Table 2.

With respect to the molecular weight distribution (Mw/Mn), the integral ratio of the peaks obtained with $^1$H-NMR and $^{13}$C-NMR [$^1$H-NMR: δ4.6-4.8 (the =CH$_2$ of 3,4-vinyl unit), 5.0-5.2 (the —CH= of 1.4-unit), $^{13}$C-NMR: [δ23.4 (1,4-cis unit), 15.9 (1,4-trans unit) and 18.6 (3,4-unit)] were calculated respectively.

Using Gel Permeation Chromatography [GPC: HLC-8220GPC made by Tosoh Corporation, column: GMH$_{XL}$ made by Tosoh Corporation-two, detector: differential refractometer (RI)] and on the basis of monodisperse polystyrene, the number average molecular weight (Mn) converting to polystyrene and the molecular weight distribution (MWD: Mw/Mn) of the polymer sample were calculated.

Further, as a comparative example, the cis-1,4 bonding amount, weight average molecular weight and molecular weight distribution of a polybutadiene rubber ("150L" made by UBE) and a polyisoprene rubber ("IR2200" made by JSR) are shown as well.

(2) Evaluation of Rubber Composition

By using the polymers obtained in each example and a comparative rubber, products obtained by compounding 50 parts by mass of carbon black per 100 parts by mass of polymer component or rubber component were prepared as samples of rubber composition. With respect to the obtained samples of rubber composition, the following evaluation was performed.

(a) Low Loss Property Evaluation

With respect to the obtained samples of rubber composition of each example, vulcanization was performed at the condition of 160° C. for 20 minutes. Then, by using a spectrometer made by Toyo Seiki Co., Ltd., a loss tangent (tan δ) was measured at the conditions of initial load: 100 g, distortion: 2%, measurement frequency: 50 Hz, measurement temperature: 25° C. and 60° C.

The evaluation of measurement value is represented by an index value with the loss tangent (tan δ) of the comparative rubber as 100, where a larger value shows a better result. The evaluation results were as shown in Tables 1 and 2.

(b) Low Wear Property

By using as tread rubber the samples of the rubber compositions obtained from the polybutadiene rubbers of Examples 1 to 8, 17, 18 and Comparative Example, sample tires were produced. A remaining groove depth of the sample tire after mounted to a vehicle and traveled for 20,000 km was measured, and was represented by an index with the remaining groove depth when using the comparative rubber as 100. A larger index value shows a more excellent wear resistance.

(c) Breaking Strength

By using as tread rubber the samples of rubber composition obtained from the polyisoprene rubbers of Examples 9 to 18 and Comparative Example, sample tires were produced. Ring-shape tensile strength of the rubbers was measured and represented by an index with the tensile strength of Comparative Example as 100. A larger index value shows a more excellent breaking strength.

TABLE 1

| | Example 1 | Example 2 | Example 3 | Example 4 | Example 5 | Example 6 | Example 7 | Example 8 | Example 17 | Example 18 | BR of Comparative Example |
|---|---|---|---|---|---|---|---|---|---|---|---|
| Modifier | — | Modifier A$^{X\cdot 1}$ | Modifier B$^{X\cdot 2}$ | Acrylonitrile | Modifier C$^{X\cdot 3}$ | Aryl glycidyl ether | Styrene | Vinyl phosphate | Modifier A$^{X\cdot 1}$ | Modifier A$^{X\cdot 1}$ | — |
| Cis-1,4 bonding amount | >99% | >99% | >99% | >99% | >99% | >99% | >99% | >99% | >99% | >99% | 97% |
| Mw | 550 | 530 | 490 | 580 | 560 | 615 | 570 | 500 | 540 | 533 | 530 |
| MWD | 2.1 | 2.1 | 2.2 | 2.4 | 2.3 | 2.4 | 2.3 | 2.2 | 2.5 | 2.3 | 2.2 |
| Low loss property | 105 | 110 | 115 | 106 | 107 | 106 | 108 | 106 | 110 | 110 | 100 |
| Low wear property | 110 | 115 | 130 | 115 | 120 | 115 | 115 | 115 | 115 | 115 | 100 |

TABLE 2

| | Example 9 | Example 10 | Example 11 | Example 12 | Example 13 | Example 14 | Example 15 | Example 16 | IR of Comparative Example |
|---|---|---|---|---|---|---|---|---|---|
| Modifier | — | Modifier A$^{X\cdot 1}$ | Modifier B$^{X\cdot 2}$ | Acrylonitrile | Modifier C$^{X\cdot 3}$ | Aryl glycidyl ether | Styrene | Vinyl phosphate | — |
| Cis-1,4 bonding amount | >98.5% | >98.5% | >98.5% | >98.5% | >98.5% | >98.5% | >98.5% | >98.5% | 98.50% |
| Mw | 1700 | 1700 | 1850 | 1800 | 2100 | 1900 | 1700 | 1850 | 1750 |
| MWD | 2.6 | 2.5 | 2.4 | 2.4 | 2.1 | 2.5 | 2.6 | 2.6 | 3.7 |
| Low loss property | 102 | 110 | 122 | 104 | 110 | 104 | 102 | 104 | 100 |
| Breaking strength | 102 | 104 | 108 | 105 | 104 | 105 | 108 | 105 | 100 |

1 4-4'-bis(diethylaminopenzophenone)
2 2-cyano pyridine
3 3-glycidopropyl trimethoxysilane From the results of Table 1 and Table 2, it was understood that in each example, it was possible to synthesize a polymer having a high cis-1,4 bonding amount (98.5% or more) at a high yield. Moreover, it was understood that the polymerization could be performed at a temperature higher than conventional.

Further, it was understood that the rubber compositions using the polymers of each example were excellent in low loss property, and the tires produced by using the rubber compositions were excellent in wear resistance.

INDUSTRIAL APPLICABILITY

According to this disclosure, it is possible to provide a method for preparing a terminal-modified conjugated diene polymer capable of achieving an extremely high cis-1,4 bonding amount without complicated preparing conditions, and a terminal-modified conjugated diene polymer obtained via the preparing method.

In addition, by using the aforementioned terminal-modified conjugated diene polymer, the obtained rubber composition and tire are excellent in durability (fracture resistance, wear resistance and crack growth resistance).

The invention claimed is:

1. A method for preparing a terminal-modified conjugated diene polymer comprising: polymerizing a conjugated diene compound by using a polymerization catalyst composition and modifying a polymer obtained via the polymerization by using a modifier,
   wherein the polymerization catalyst composition contains a rare earth element compound, and a coordination compound having a cyclopentadiene skeleton selected from substituted or unsubstituted cyclopentadienes, substituted or unsubstituted indenes, and substituted or unsubstituted fluorenes, and
   wherein the polymerization and modification is performed in a one-pot way.

2. The method for preparing a terminal-modified conjugated diene polymer according to claim 1, wherein the rare-earth element compound is represented by general formula (a-1):

$$M\text{-}(AQ^1)(AQ^2)(AQ^3) \qquad (a\text{-}1)$$

in the formula, M is scandium, yttrium or lanthanides; $(AQ)^1$, $(AQ)^2$ and $(AQ)^3$ are the same or different functional groups having at least one M-A bonds, where A is nitrogen, oxygen or sulfur.

3. The method for preparing a terminal-modified conjugated diene polymer according to claim 1, wherein the catalyst composition further contains a compound represented by general formula (X):

$$YR^{31}{}_aR^{32}{}_bR^{33}{}_c \quad (X)$$

in the formula, Y is a metallic element selected from Group 1, Group 2, Group 12 and Group 13 of the Periodic Table, $R^{31}$ and $R^{32}$ are C1 to C10 hydrocarbon groups or hydrogen atom, $R^{33}$ is a C1 to C10 hydrocarbon group, where $R^{31}$, $R^{32}$ and $R^{33}$ may be the same or different from each other; in addition, in the case that Y is a metallic element selected from Group 1 of the Periodic Table, a=1 and b, c=0; in the case that Y is a metallic element selected from Group 2 and Group 12 of the Periodic Table, a, b=1 and c=0; and in the case that Y is a metallic element selected from Group 13 of the Periodic Table, a, b, c=1.

4. The method for preparing a terminal-modified conjugated diene polymer according to claim 1, wherein the coordination compound having a cyclopentadiene skeleton has an indenyl group.

5. The method for preparing a terminal-modified conjugated diene polymer according to claim 1, wherein the polymerization catalyst composition further contains an aluminoxane composition.

6. The method for preparing a terminal-modified conjugated diene polymer according to claim 1, wherein the polymerization catalyst composition further contains a halogen compound.

7. The method for preparing a terminal-modified conjugated diene polymer according to claim 1, wherein the modifier is at least one selected from the following compounds (a) to (j):

(a) is a compound represented by general formula (V):

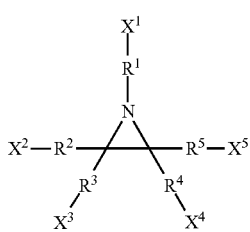

(V)

where $X^1$ to $X^5$ each represent a monovalent functional group containing at least one selected from the group consisting of a hydrogen atom, a halogen atom, carbonyl groups, thiocarbonyl groups, isocyanate groups, thioisocyanate groups, epoxy groups, thioepoxy groups, halogenated silyl groups, hydrocarbyloxysilyl groups, and sulfonyloxy groups, and containing no active proton nor onium salt; $X^1$ to $X^5$ may be the same or different with proviso that at least one of $X^1$ to $X^5$ is not a hydrogen atom; $R^1$ to $R^5$ independently represent a single bond or a divalent C1 to C18 hydrocarbon group; and a plurality of aziridine rings may be bonded via any of $X^1$ to $X^5$ and $R^1$ to $R^5$;

(b) is a halogenated organic metal compound, halogenated metal compound, or organic metal compound represented by $R^6{}_nM'Z_{4-n}$, $M'Z_4$, $M'Z_3$, $R^7{}_nM'(—R^8—COOR^9)_{4-n}$ or $R^7{}_nM'(—R^8—COR^9)_{4-n}$, where $R^6$ to $R^8$ may be the same or different and are each a C1 to C20 hydrocarbon group; $R^9$ is a C1 to C20 hydrocarbon group and optionally containing a carbonyl or ester group on a side chain; M' is a tin, silicon, germanium, or phosphorus atom; Z is a halogen atom; and n is an integer of 0 to 3;

(c) is a heterocumulene compound containing a Y=C=Y' bond in the molecule, where Y is a carbon, oxygen, nitrogen, or sulfur atom; and Y' is an oxygen, nitrogen, or sulfur atom;

(d) is a heterotricyclic compound having a bond represented by general formula (VI):

(VI)

where Y' is an oxygen or sulfur atom;

(e) is a halogenated isocyano compound;

(f) is a carboxylic acid, acid halide, ester, carbonic ester, or acid anhydride represented by $R^{10}$—$(COOH)_m$, $R^{11}$$(COZ)_m$, $R^{12}$—$(COO$—$R^{13})$, $R^{14}$—$OCOO$—$R^{15}$, $R^{16}$—$(COOCO$—$R^{17})_m$, or general formula (VII):

(VII)

where $R^{10}$ to $R^{18}$ may be the same or different and are each a C1 to C50 hydrocarbon group; Z is a halogen atom; and m is an integer of 1 to 5;

(g) is a carboxylic acid metal salt represented by $R^{19}{}_kM''$$(OCOR^{20})_{4-k}$, $R^{21}{}_kM''(OCO$—$R^{22}$—$COOR^{23})_{4-k}$, or general formula (VIII):

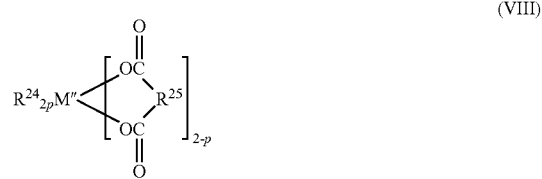

(VIII)

where $R^{19}$ to $R^{25}$ may be the same or different and are each a C1 to C20 hydrocarbon group; M'' is a tin, silicon, or germanium atom; p=1; and k is an integer of 0 to 3;

(h) is an N-substituted aminoketone, an N-substituted aminothioketone, an N-substituted aminoaldehyde, an N-substituted aminothioaldehyde, or a compound having a C-(=M)-N< bond in the molecule, where M represents an oxygen or sulfur atom;

(i) is a compound having a N≡C— bond; and (j) is a compound having a phosphate residue represented by general formula (I):

(I)

in general formula (I), $R^1$ and $R^2$ independently represent a monovalent hydrocarbon group selected from straight or branched chain C1 to C20 alkyl groups, monovalent C3 to C20 alicyclic hydrocarbon groups and monovalent C6 to C20 aromatic hydrocarbon groups, or a hydrogen atom.

* * * * *